US009336154B2

(12) United States Patent
LeMire et al.

(10) Patent No.: US 9,336,154 B2
(45) Date of Patent: May 10, 2016

(54) DATA BUS EFFICIENCY VIA CACHE LINE USURPATION

(71) Applicant: Avago Technologies General IP (Singapore) Pte. Ltd., San Jose, CA (US)

(72) Inventors: Steven Gerard LeMire, Costa Mesa, CA (US); Vuong Cao Nguyen, Costa Mesa, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/835,936

(22) Filed: Aug. 26, 2015

(65) Prior Publication Data

US 2015/0378923 A1 Dec. 31, 2015

Related U.S. Application Data

(63) Continuation of application No. 14/687,470, filed on Apr. 15, 2015, now Pat. No. 9,195,605, which is a continuation of application No. 14/517,555, filed on Oct. 17, 2014, now Pat. No. 9,043,558, which is a continuation of application No. 11/966,900, filed on Dec. 28, 2007, now Pat. No. 8,892,823.

(51) Int. Cl.
*G06F 12/00* (2006.01)
*G06F 12/08* (2016.01)

(52) U.S. Cl.
CPC ........ *G06F 12/0888* (2013.01); *G06F 12/0835* (2013.01); *G06F 12/0893* (2013.01); *G06F 2212/1024* (2013.01); *G06F 2212/1044* (2013.01); *G06F 2212/604* (2013.01); *G06F 2212/608* (2013.01); *G06F 2212/6046* (2013.01); *G06F 2212/621* (2013.01)

(58) Field of Classification Search
CPC G06F 12/0893; G06F 12/0802; G06F 12/121
See application file for complete search history.

(56) References Cited

U.S. PATENT DOCUMENTS

| 5,201,041 | A | * | 4/1993 | Bohner | G06F 12/08048 711/122 |
|---|---|---|---|---|---|
| 5,867,732 | A | * | 2/1999 | Young | G06F 11/1076 710/52 |
| 6,978,349 | B1 | * | 12/2005 | Wilkes | G06F 12/0802 711/118 |
| 7,325,098 | B1 | * | 1/2008 | Aho | G06F 12/0811 711/118 |
| 7,421,623 | B2 | * | 9/2008 | Haugh | G06F 1/206 702/130 |
| 8,892,823 | B2 | | 11/2014 | LeMire | |
| 9,195,605 | B2 | | 11/2015 | LeMire | |

(Continued)

OTHER PUBLICATIONS

The Free Online Dictionary, definition: while, Jan. 31, 2014.

(Continued)

*Primary Examiner* — Gurtej Bansal

(57) ABSTRACT

Embodiments of the current invention permit a user to allocate cache memory to main memory more efficiently. The processor or a user allocates the cache memory and associates the cache memory to the main memory location, but suppresses or bypassing reading the main memory data into the cache memory. Some embodiments of the present invention permit the user to specify how many cache lines are allocated at a given time. Further, embodiments of the present invention may initialize the cache memory to a specified pattern. The cache memory may be zeroed or set to some desired pattern, such as all ones. Alternatively, a user may determine the initialization pattern through the processor.

20 Claims, 3 Drawing Sheets

(56) References Cited

U.S. PATENT DOCUMENTS

2003/0185058 A1 10/2003 LeClerg
2004/0221102 A1 11/2004 Watanabe
2007/0079070 A1 4/2007 Piry et al.
2007/0186043 A1 8/2007 Emmot et al.
2008/0104329 A1 5/2008 Gaither et al.

OTHER PUBLICATIONS

Free Dictionary Online, freedictionary.com, 2012.

* cited by examiner

DATA BUS EFFICIENCY VIA CACHE LINE USURPATION

This application is a continuation of application Ser. No. 14/687,470, filed Apr. 15, 2015, which is a continuation of application Ser. No. 14/517,555, filed Oct. 17, 2014, now U.S. Pat. No. 9,043,558, issued Feb. 5, 2015, which is continuation of application Ser. No. 11/966,900, filed Dec. 28, 2007, now U.S. Pat. No. 8,892,823, issued Nov. 18, 2014. The above-referenced U.S. patent applications are hereby incorporated by reference herein in their entirety.

FIELD OF THE INVENTION

This invention relates to cache memory manipulation and control, and more particularly to enabling a cache allocation and initialization of data in a manner to increase efficiency and performance.

BACKGROUND OF THE INVENTION

A computing system generally contains a processor, memory, and a data bus. The processor performs the operations of the computer, executing code, and moving data from and to memory locations. The data bus sends or retrieves data to or from main memory. A conventional computer additionally contains input and output ports and interfaces to provide data input or output from the processor to external devices (keyboard or display).

Cache memory is a copy of the main memory that is repeatedly used to reduce processing time. Generally, whenever memory is accessed, to retrieve information or to store information, the processor must traverse the data bus, request the data, and wait for a response. This takes a lot of processing time. To reduce the time for processing and manipulating memory over the data bus, cache memory is used. The processor uses cache memory to avoid traversing a bus, and waiting for a response. Since the cache is inside the processor, the cache memory reduces bus calls. The cache memory can be accessed much quicker than continually reading and writing to main memory. The processor then manipulates the cache memory directly. When the processor is done with the memory, or when additional cache memory space is needed for another application, the cache memory is written back to the main memory, and data from a different memory location is written into the cache memory.

Generally, cache controllers operate in a manner that is invisible to the software being executed. However, especially in embedded systems, there are reasons to provide capabilities to the software to manipulate cache entries either by direct access to cache entries or indirect access via commands that reference desired memory addresses. These commands often include the ability to invalidate a cache entry and/or clean an entry. The data in an entry is written out when that data has changed since the main memory has been written. Often times, these instructions operate on the real memory address as opposed to the cache entry. That is, the specified address is looked up in the cache and if present, the entry where the block is found is cleaned and/or invalidated.

Memory blocks are often automatically inserted into a cache entry upon a read access to the memory. That is, the cache controller will find an empty cache entry, or free an existing one by evicting an entry in the index mapped by the specified address. As the data is read from main memory, a whole block is read and copied into the empty cache entry. There are times, however, when the software is referencing memory in which the existing data is going to be ignored. That is, the software desires an area of memory in cache, but is going to immediately rewrite the data, not using the existing information in that memory location. Writing the data before it is in cache can be expensive from a performance standpoint as can waiting for data to be read from memory that is going to be ignored anyway.

FIG. 1 illustrates an exemplary conventional computing system 100 with processor 102, cache memory 104, data bus 106, and input/output interfacing ports. The processor 102 controls the data bus 106 to read from or write to main memory 114. The main memory 114 may additionally be accessed over a server 112, as part of a storage area network. The input/output interface 108 permits a user to interact with the computing system 100 through input and output devices 110 such as a keyboard or display. The processor 102 will request data from the main memory 114 through the data bus 106. The data in the main memory location requested 120 is then retrieved by the data bus 106 and copied into the cache memory location 122. The processor may then manipulate the data directly. Once the memory space is needed by another main memory allocation, or the processor is finished manipulating the data, the data bus will write the cache memory data back to the main memory location. The cache memory location 122 links to the main memory location 120 by using part of the available memory as an index to the main memory location.

Though the cache memory is an attempt to reduce the processing time in manipulating memory by moving a part of that memory into the processor, there are still delays in retrieving the data from memory. Before the cache memory is used, the processor still traverses the data bus, requests the data, and waits for a response. The main memory is copied into the cache memory before it is manipulated. Once in cache, the processor can manipulate the memory relatively fast. However, waiting for the processor to retrieve the memory and store it in cache is still an expensive operation, in terms of processing time.

One solution to the delay time in accessing memory is a preload instruction. The preload instruction is called by a user when a memory location is accessed in advance of when it is needed by the processor. The preload instruction permits a user to load memory into cache before it is actually needed. Therefore, the system hides the copy time if the request is sent with sufficient time prior to its use. However, the preload instruction takes up cache memory before it is needed by the processor and also occupies the data bus which may slow down other operations unnecessarily. A cache memory block is written to main memory and the cache memory allocated to the new memory. This allocation is potentially before the processor is finished with a previous memory manipulation. If the function is called too early, the memory fetched may have to be written back to memory and never accessed by the processor. The cache may evict the preloaded memory location to manipulate other memory needed by the processor before the desired memory manipulation is performed. In addition, a programmer must foresee the need for the memory space before it is actually required by the processor. In contrast, if the function is called too late, then the processor may still stall if sufficient time was not given to traverse the data bus for the required memory allocation.

An example of a conventional processor, including the input/output interface, data cache, and data bus is produced by ARM. Specifically, the ARM 1156T2 provides the preload instruction to retrieve main memory before it is required by the processor. Information on the ARM processors is generally available at http://infocenter.arm.com/help/index.jsp, the contents of which are incorporated by reference herein. Specifically, the documentation for the ARM 1156 CPU is available at http://infocenter.arm.com/help/topic/com.arm.doc.ddi0338g/DDI0338G_arm1156t2s_r0p4_trm.pdf, the contents of which are incorporated by reference herein.

An example of when the preload instruction may be used is when an area of memory is needed to control an input/output operation. A block of cache memory is allocated to control everything the processor needs for the operation. The data is copied into cache with sufficient time that the processor has the memory available when the processor is ready to manipulate the data; therefore, the processor does not have to wait for the memory to be read. However, if the pre-load is used too often, then the bus is slowed down. Generally, the cache and the bus can handle only a limited number of calls before it is no longer efficient. Also, if another application needs to retrieve information, it may be slowed down by the pre-load retrieve, therefore interfering with another application or user before the retrieved information is needed by the preload user.

Generally, the cache is a working copy of main memory, which is more expensive to access. When the memory is about to be rewritten, reading it into cache is a wasteful operation on the memory bus. It not only can result in processing delays while waiting for the memory read to complete, but it can add to congestion in the memory interface.

SUMMARY OF THE INVENTION

Generally, when the processor needs memory, the processor allocates a cache memory location with the main memory, and reads or retrieves the data held in the main memory location into the cache location. If the information at the retrieved memory location is not needed for future computations, but will simply and immediately be rewritten, then the retrieval time to read the memory location is wasted. Therefore, embodiments of the present invention allocate the cache memory and associate the cache memory to the main memory location, but suppresses or bypassing reading the main memory data into the cache memory. Therefore, the cache memory associated with the main memory would contain whatever data happened to be in the cache entry chosen by the processor.

The request to allocate cache memory may be automatically issued simply by the software requesting data from a main memory address, or alternatively, may be made specifically through a control command to the cache controller. Some embodiments of the present invention permit the user to specify how many cache lines are allocated. Therefore, a user may save additional time by allocating multiple cache lines at once with a single request.

Further, embodiments of the present invention may initialize the cache memory to a specified pattern. Therefore, the previous data in the cache memory is not inadvertently used. The initialization also saves the processing time, and software code to initialize the cache memory locations through software instructions. The cache memory may be zeroed or set to some desired pattern, such as all ones. The initialization may alternatively be set through registers. A user may determine the initialization pattern within the processor registers.

DETAILED DESCRIPTION OF THE PREFERRED EMBODIMENT

Figure 1:
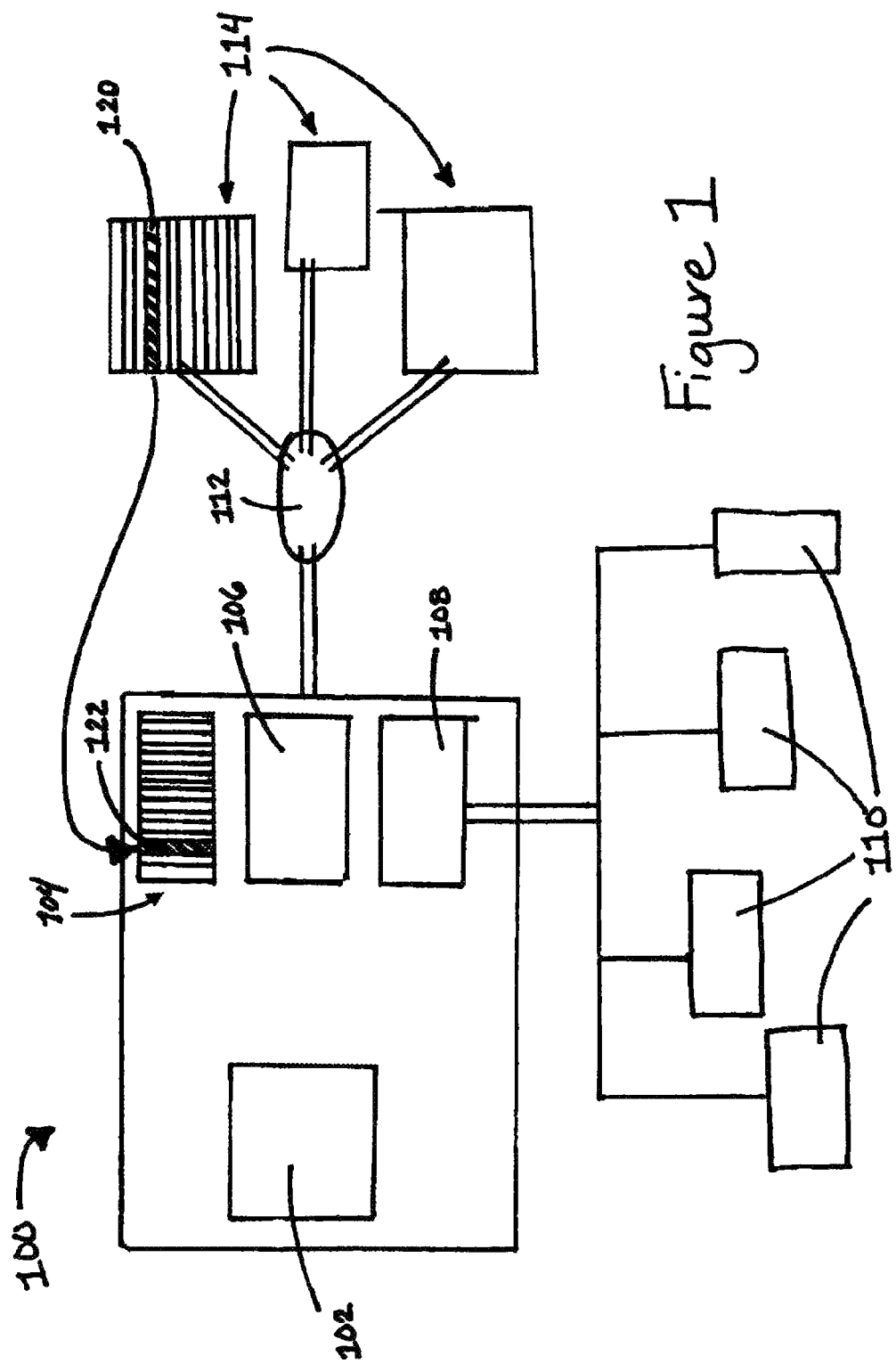
FIG. 1 illustrates an exemplary conventional computing system.

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Generally, when memory is needed for a new process, the processor assigns the new memory locations to a cache memory area. The processor reads (retrieves) the memory from the main memory and writes that information into the newly allocated cache memory. The read time can take a substantial amount of processing time. If a lot of memory is being allocated, then the required retrieval time is multiplied by the amount of cache memory allocated. If the programmer knows that the information at the retrieved memory location is not needed for future computations, but will simply and immediately be rewritten, then the retrieval time is wasted. Generally, the copy time is much longer than the processing time of other activities and the processor will "stall," i.e. not perform any functions, until the retrieved data is copied. For example, if an operation takes 2500 clock cycles, the retrieval time can take 160 clock cycles for allocating a large block of memory; removing the copy function when allocating cache memory could save up to 7% of the processing time. Therefore, large numbers of instruction cycles can be eliminated by bypassing unnecessary reads of main memory, and avoiding processor execution stalling if multiple reads are outstanding.

Another embodiment of the present invention may include initializing the cache memory once it is allocated. Since the data will be immediately rewritten, to the initialized variable, it is preferred that the initialization is performed while bypassing the read from main memory. However, the initialization may be done independently after the data is read from main memory and allocated to cache memory. The cache memory may be zeroed or initialized to some pre-set variable. This removes the need to initialize the memory through the software individually. This embodiment may prevent using data left over from a previous context. The initialization may additionally reduce the program run time, since the program code is reduced, and the initialization may be performed through the hardware itself. As an example, given specific processing commands, the initialization may increase system performance by up to about 3%. Therefore, bypassing the read from main memory in conjunction with the initialization could save as much as 10% processing time per operation.

Although embodiments of the invention may be described herein primarily in terms of reading data from main memory into cache, it should be understood that embodiments of the invention are not so limited, but extend to writing data back to main memory. For example, if the system is writing to main memory, so it is irrelevant what data currently resides in that main memory location, the system can bypass or suppress the read from main memory into cache before the main memory location is rewritten. Generally, a cache fill operation is when the main memory is read into cache before the main memory is re-written. In addition, embodiments of the present invention may also be described herein in terms of a Storage Area Network (SAN), but it should be understood that embodiments of the present invention are not so limited, and may include other networking systems, such as a local area network, the internet, or Ethernet.

Figure 2:
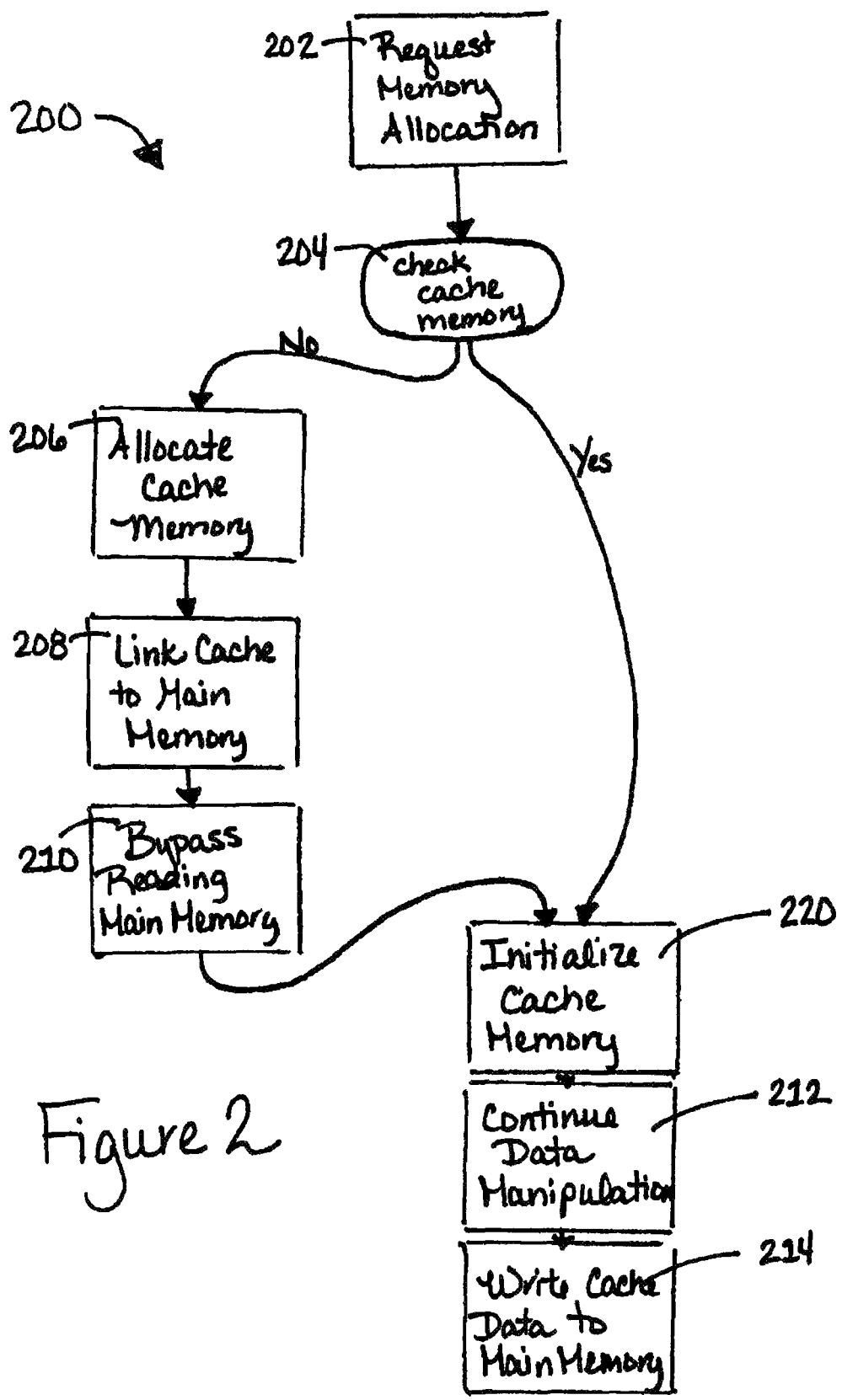
FIG. 2 illustrates exemplary logic of allocating cache memory according to embodiments of the invention.

FIG. 2 illustrates exemplary logic of allocating cache memory according to embodiments of the invention. The cache allocation logic 200 starts at step 202 with the request for main memory allocation. The memory allocation request may be automatically issued simply by the software requesting data from a main memory address, or alternatively, may be made specifically through a control command to the cache controller. In response to the memory request 202, the processor checks the cache memory to ensure the memory has not already been copied from main memory. The cache memory needs to be checked, or else two copies of the same memory space may be loaded into cache. Such duplication would likely cause problems when the processor attempts to access the memory location and manipulates the different locations at different times returning the incorrect value to main memory. Therefore, the cache controllers keep only a single copy of the same memory space in cache.

An alternative embodiment of the present invention also lets a user specify the number of cache lines to be allocated. If a given amount of cache memory is needed for a specific operation, the user can directly allocate the cache memory for the desired operation. Therefore, the memory allocation request may come from either the processor or directly from a user. Therefore, a user may save time by allocating multiple cache lines with a single request.

If the main memory has already been allocated to the cache memory, the processor continues with the data manipulation. If the memory has not already been loaded into cache, then the logic proceeds to block 206 where the processor allocates the main memory to cache. If the associated cache line is not free at the necessary cache index, an eviction takes place, freeing the necessary space. In allocating the memory to cache, the main memory location is linked to the cache memory, step 208, so it may be rewritten after the processor manipulates the cache memory. However, during the allocation at 210, the read function from the main memory to the cache memory is bypassed or suppressed. The processor does not read the data stored at the main memory location or copy it into the cache memory. Whatever information left in cache from the previous system use would stay in the cache, or the processor can initialize the cache location. The system then continues with the data manipulation from the cache memory location, step 212. Once the cache memory location is needed for another context, or the manipulation is complete, the cache memory data is then written to the main memory linked to that cache location, at block 214.

Another feature of one embodiment of the present invention is to initialize the data when the cache lines are allocated, at step 220. The cache controller may zero the memory at the allocated cache location. Alternatively, the initialization may be set to some other preset pattern. For example, the registers associated with the processor may be manipulated to preset an initialization value used when the initialization function is called. The initialization feature may be used in conjunction with the memory allocation, to ensure that the previous data in the cache line is cleared. The initialization function may alternatively be used at step 220 to clear the cache already associated to the desired memory location. The initialization function may, alternatively, be available without the memory allocation. The initialization would clear out the data copies from main memory to ensure that stale data is not used. The initialization removes the need to initialize each cache line, when the data is not needed, by using software commands to write the initialization data to each cache line.

Figure 3:
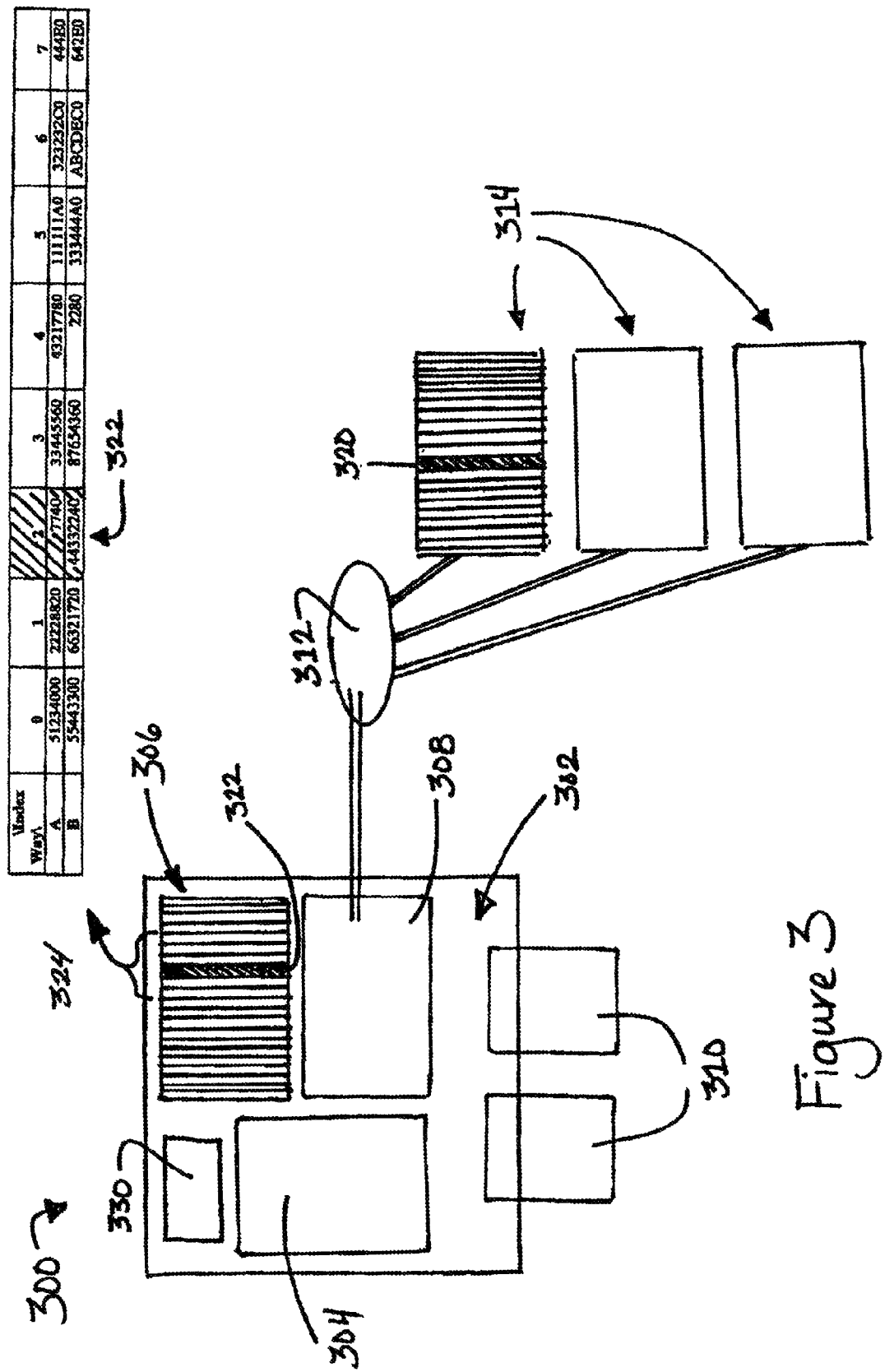
FIG. 3 illustrates an exemplary Storage Area Network employing the memory allocation and read bypass attributes according to embodiments of the invention.

FIG. 3 illustrates an exemplary Storage Area Network (SAN) 300 employing the memory allocation and read bypass attributes according to embodiments of the invention. The processing unit 302 includes a core processor 304, cache memory 306, a data bus 308, and ports for input from and output to a user 310. The processor 304 accesses main memory 314 through the data bus 308. The data bus 308 reads data from main memory 314 and writes data back to main memory 314. The data may be sent over a server 312. Generally, for network storage applications, blocks of memory are used to house all the operating commands. Because different users are running independent applications and accessing different memory locations, it is unlikely that the needed memory is already in the cache memory. If the memory happens to be in cache, then nothing is lost by implementing the embodiments of the current invention.

First, the processor 304 requests data from a main memory block 314 through the data bus 308. The processor may need the memory location in order to implement the operating commands of a new user on the storage area network. For instance, a user may attempt to transfer data from one computer to another. Since a new user is accessing the system, it is unlikely that the main memory would already be allocated to the cache memory. However, the processor 304 still checks the cache memory for the desired allocation to prevent duplicating memory allocations within the cache memory 306. The data in the main memory will immediately be overwritten once allocated to the cache to store the data required for the new user. Therefore, the cache memory 306 is linked to the main memory 314, but the processor bypasses or suppresses reading the main memory data to the cache memory.

As a further example of the cache according to embodiments of the present invention, the system processing unit 302 has a cache line size of 32 bytes. The cache 306 also has 512 bytes and is two-way associative. Therefore, each main memory 314 block can only be stored in two locations within the cache memory 306. The cache memory 306 may be fully associative, where a main memory block may be stored at any location within the cache. However, this implementation is more expensive to implement in terms of processing time to access, as well as hardware. The association may, alternatively, be any N-way associative memory allocation, where the main memory may be stored in any of N blocks of the cache memory. Cache entry indexing is done via bits 5-7 of an address. Thus, the resulting exemplary cache setup 324 is available to the processor. For this example, all addresses are expressed in hexadecimal notation. For the two-way associative embodiment shown, if a structure is allocated at address 33240, either entry 2A or 2B, 322, will be selected when a read takes place at that location. The latency involved in reading the block at 33240 may be unnecessary if the data is going to be rewritten immediately after the data arrives in the cache. Therefore, one embodiment of the present invention specifies the cache controller commands which allow the software to be given a cache entry without having read the main memory.

The association of main memory to cache memory is done by the processor and handled directly within the hardware. The processor needs instructions for the cache controller to perform an operation. Such instructions are referred to as co-processor instructions. The co-processor instruction may be handled by the main processor or by a co-processing unit.

Firmware residing in memory or flash 330, which are forms of computer-readable media, can be executed by processor 304 to perform the operations described above with regard to allocating and initializing the cache memory attributes of the current invention. Furthermore, memory or flash 330 can perform the initialization of the cache lines in connection with allocating the memory or as a separate instruction.

Embodiments of the present invention can be used immediately when needed. Since the main memory read is bypassed, the processor should link the main memory to the cache in almost no time. Therefore, the instruction call can occur immediately when the memory is needed and the need for memory does not have to be anticipated. It also reduces the chance of evicting presently needed cache memory location. When cache is allocated, the system must determine which cache memory to evict (return to main memory) to provide the requested cache space.

The initialization may be accomplished with the hardware, reducing software code. Therefore, the code takes less time to run. Additionally, the overall code size is smaller and has a better chance of fitting into its own instruction cache. Alternatively, the initialization may be accomplished through the processor instructions, or firmware. Initializing the data when it is allocated may also serve as a back security protection. If the information is initialized before manipulated by the user, then there is no chance that the previous information in the cache would inadvertently be revealed or used inappropriately or unintentionally by the user. This is especially important if different users are potentially using the same memory area, and so a previous user would be reassured that a later user could not inadvertently see or access their confidential information.

Depending on whether the system uses a write-through, or write-back, the initialized information written to the cache would be written to the main memory directly. Preferably, the system uses a write-back method so that the initialized value is not immediately written back into main memory. In a write-through scheme, since the system will immediately manipulate this new cache value, the immediate write through to main memory of the initialized value would be inefficient. Therefore, in one embodiment of the present invention, the initialization feature may be disabled when a write-through operation is used.

Note that the firmware can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium include, but are not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, a memory stick, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A system, comprising:
   a cache;
   a storage device; and
   a memory controller coupled to the cache and operable to determine whether a piece of data is required for a system operation,
   if the piece of data is not required for the system operation, the memory controller being operable to write the piece of data directly to the storage device while the cache is allocated for the piece of data, wherein the piece of data is not written to the cache during the write of the piece of data to the storage device,
   if the piece of data is required for a system operation, the memory controller being operable to write the piece of data into the cache.

2. The system of claim 1, the memory controller initializing a location in the cache through hardware, if the piece of data is not required for the system operation.

3. The system of claim 1, the memory controller initializing a location in the cache if a location in the storage device is already associated with the cache.

4. The system of claim 1, wherein the memory controller is operable to specify a number of cache lines to allocate.

5. The system of claim 1, wherein the memory controller is operable to allocate a plurality of cache lines with a single request.

6. The system of claim 1, wherein the memory controller is operable to initialize the cache according to a pattern.

7. A method of cache allocation, the method comprising:
   determining whether a piece of data is required for a system operation,
   writing, if the piece of data is not required for the system operation, the piece of data directly to a storage device while a cache location is allocated for the piece of data, wherein the piece of data is not written to the cache during the writing of the piece of data to the storage device, and
   writing the piece of data to into the cache location, if the piece of data is required for the system operation.

8. The method of claim 7, the method comprising initializing the cache location through hardware, if the piece of data is not required for the system operation.

9. The method of claim 7, the method comprising initializing the cache location if a location in the storage device is already associated with the cache.

10. The method of claim 7, the method comprising allocating a plurality of cache lines with a single request, if the piece of data is not required for the system operation.

11. The method of claim 7, the method comprising allocating a plurality of cache lines with a single request.

12. The method of claim 7, the method comprising initializing the cache location according to a pattern.

13. The method of claim 7, the method comprising initializing the cache location to zero.

14. A network device with cache allocation, the network device comprising:
- a cache;
- a storage device; and
- a hardware processor operable to write, if the piece of data is not required for a system operation, a piece of data directly to a storage device while the cache is allocated for the piece of data, wherein the piece of data is not written to the cache during the write of the piece of data to the storage device,
- the hardware processor being operable to write the piece of data into the cache, if the piece of data is required for the system operation.

15. The network device of claim 14, wherein the hardware processor is operable to initialize the cache if the piece of data is not required for the system operation.

16. The network device of claim 14, wherein the hardware processor is operable to initialize the cache if the piece of data is not required for the system operation and a location in the storage device is already associated with the cache.

17. The network device of claim 14, wherein the hardware processor is operable to allocate a plurality of cache lines with a single request, if the piece of data is not required for the system operation.

18. The network device of claim 14, wherein the hardware processor is operable to allocate a plurality of cache lines with a single request.

19. The network device of claim 14, wherein the hardware processor is operable to initialize the cache according to a pattern.

20. The network device of claim 14, wherein the hardware processor is operable to initialize the cache to zero.

* * * * *